(12) United States Patent
Lee

(10) Patent No.: US 7,494,253 B2
(45) Date of Patent: Feb. 24, 2009

(54) PROJECTION SYSTEM AND LIGHT-GUIDING ASSEMBLY THEREOF

(75) Inventor: Cheng-Kuang Lee, Taipei County (TW)

(73) Assignee: QISDA Corporation, Taoyuan (TW)

( * ) Notice: Subject to any disclaimer, the term of this patent is extended or adjusted under 35 U.S.C. 154(b) by 0 days.

(21) Appl. No.: 11/523,900

(22) Filed: Sep. 19, 2006

(65) Prior Publication Data

US 2007/0075234 A1 Apr. 5, 2007

(30) Foreign Application Priority Data

Sep. 23, 2005 (TW) .............................. 94133082 A

(51) Int. Cl.
*F21V 7/00* (2006.01)
(52) U.S. Cl. ...................... 362/296; 362/621
(58) Field of Classification Search ................ 362/551, 362/296; 353/81, 97–98, 102; 359/591
See application file for complete search history.

(56) References Cited

U.S. PATENT DOCUMENTS 5,446,816 A * 8/1995 Shiraishi et al. ............... 385/33
5,680,257 A * 10/1997 Anderson .................... 359/727
2003/0007132 A1 * 1/2003 Shouji ........................ 353/30

FOREIGN PATENT DOCUMENTS

CN 1510453 A 7/2004
CN 1549000 A 11/2004

* cited by examiner

*Primary Examiner*—Ali Alavi
(74) *Attorney, Agent, or Firm*—Quintero Law Office

(57) ABSTRACT

A projection system comprises a light source module and a light-guiding assembly. The light source module comprises a reflecting cover and a light source disposed in the reflecting cover to form a first beam with a first f-number. The light-guiding assembly comprises a body with an incident end and a lens disposed on the incident end. The first beam passes through the lens disposed on the incident end to form a second beam with a second f-number. The second f-number of the second beam is different from the first f-number of the first beam.

11 Claims, 8 Drawing Sheets

PROJECTION SYSTEM AND LIGHT-GUIDING ASSEMBLY THEREOF

BACKGROUND

The invention relates to a projection system and a light-guiding assembly thereof, and in particular to a projection system and a light-guiding assembly having a lens capable of decreasing light leakage and increasing the contrast of a projected image.

F-number $$\left(f/\# \equiv \frac{f}{D}\right)$$

represents the ability of light from an optical element to converge, i.e., the ratio of focus length (f) and diameter of incident pupil (D). In the formula of $$\theta \cong \mathrm{Sin}^{-1}\frac{1}{2F},$$

a convergent angle is in proportion to f-number. That is to say, the smaller of the convergent angle, the more light beam can converge and the slower the light path.

FIG. 1 is a schematic view of a conventional Digital Light Processing (DLP) system. A light beam 100a generated from a light source 10a is guided and output by a light pipe 12a. The light beam 100a, before entering the light pipe 12a and exiting therefrom, maintains the same f-number. The output light beam 100a is sequentially projected from a projecting lens 14a to a reflecting lens 16a, reflected from the reflecting lens 16a to a power mirror 18a, reflected from the power mirror 18a to a light valve 20a (e.g. Digital Micro-mirror Device, DMD). Finally, an image reflected from light valve 20a the light valve 20a can be projected to a screen by a projecting lens 22a.

The light valve 20a, a main device for the DMD projection system, comprises a ceramic substrate 19, a DMD chip 21 formed by a plurality of micromirrors, an aperture 22 and a window assembly 23. The window assembly 23 disposed on the ceramic substrate 19 is used to isolate the ceramic substrate 19, and the aperture 22 is disposed between the ceramic substrate 19 and the window assembly 23.

FIG. 4A is a schematic view showing distribution of light path of the conventional projection system of FIG. 1. The light beam is transmitted to the light valve 20a and reflected by the projecting lens 22a. A projected area by the light beam reflected from the projecting lens 22a is larger than the area of the DMD chip 21 if the reflected light beam is divergent. Scattered light formed by a light reflected by the window assembly 23, the aperture 22 and the ceramic substrate 19 enter the light processing system, cause light leakage and decrease the contrast of the projected image.

To adjust the contrast of the projection system, the number of lens assemblies must be added in the DLP system. However, the layout of the DLP system becomes complicated and the size of the DLP system must be increased.

SUMMARY

The invention provides a projection system utilizing a light-guiding assembly to increase contrast of a projected image. The projection system comprises a light source module and a light-guiding assembly. The light source module comprises a reflective mask having an opening and a light source disposed in the reflective mask, to form a first light beam reflected from the reflective mask and passing through the opening. The light-guiding assembly for receiving the first light beam to form a second light beam comprises a body having an incident end and a main lens disposed on the incident end. The first light beam comprises a first f-number and passes through the main lens to form the second light beam, wherein the second light beam comprises a second f-number different from the first f-number. The second f-number is larger than the first f-number. Thus, the light beam is efficiently reflected to the lens by the digital light processing system, preventing the scattered light from entering the light processing system, decreasing light leakage and increasing contrast of the projected image.

DESCRIPTION OF THE DRAWINGS

The invention can be more fully understood by reading the subsequent detailed description and examples with references made to the accompanying drawings, wherein.

DETAILED DESCRIPTION

Figure 1:
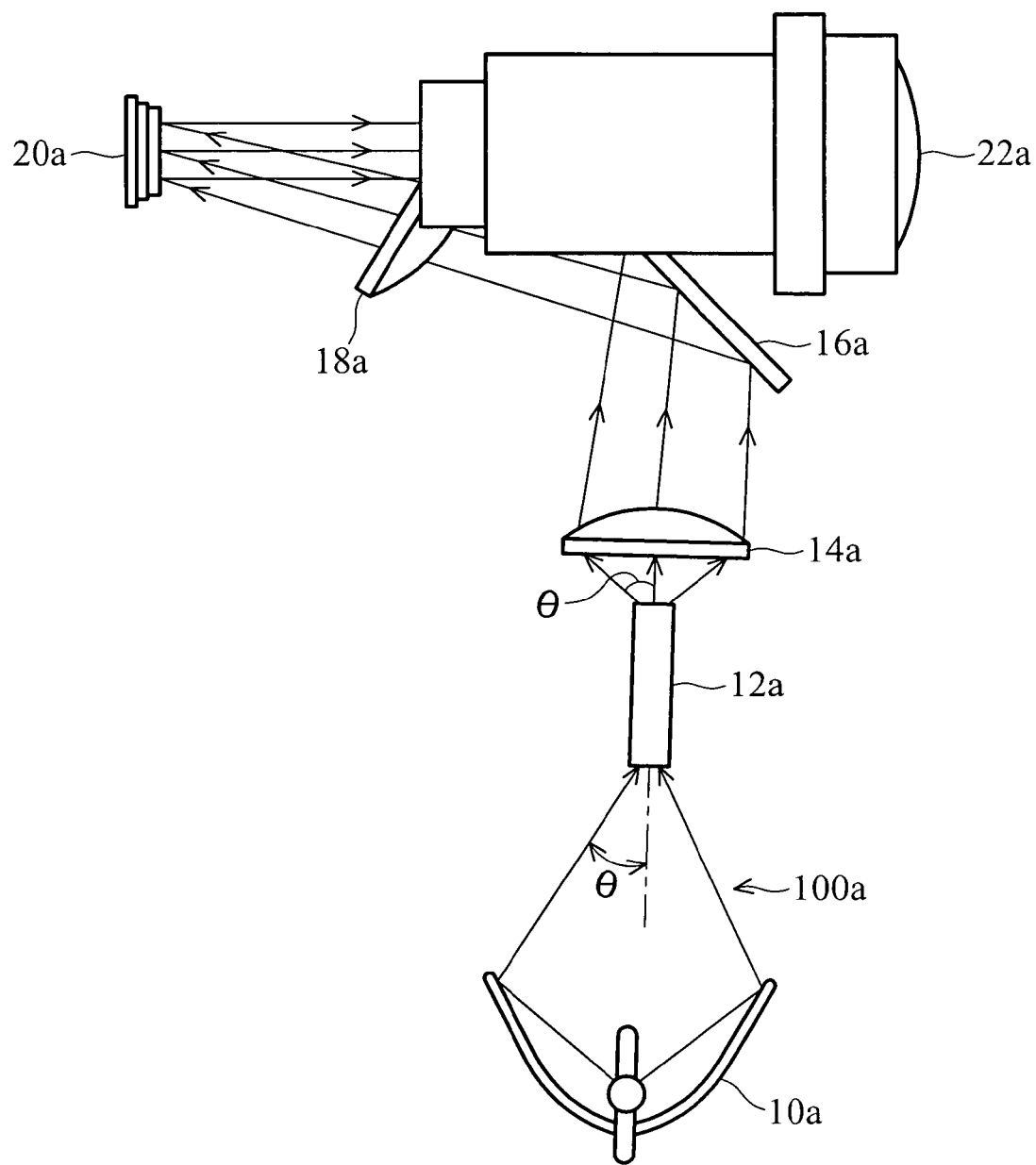
FIG. 1 is a schematic view of a conventional projection system.
Figure 2A:
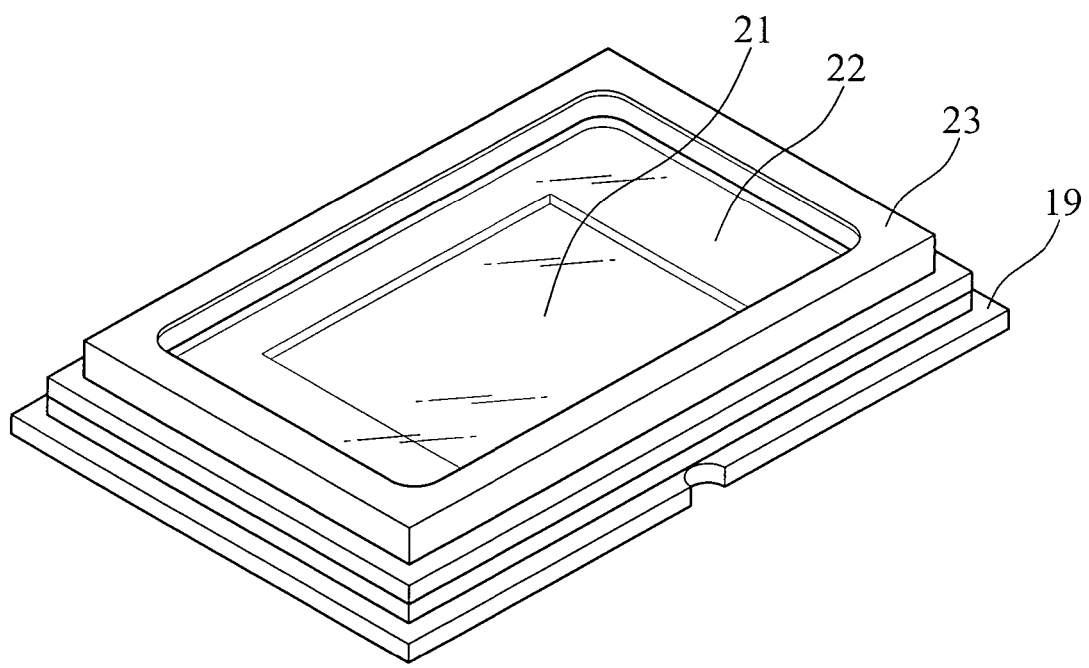
FIG. 2A is a perspective view of a light valve (20a).
Figure 2B:
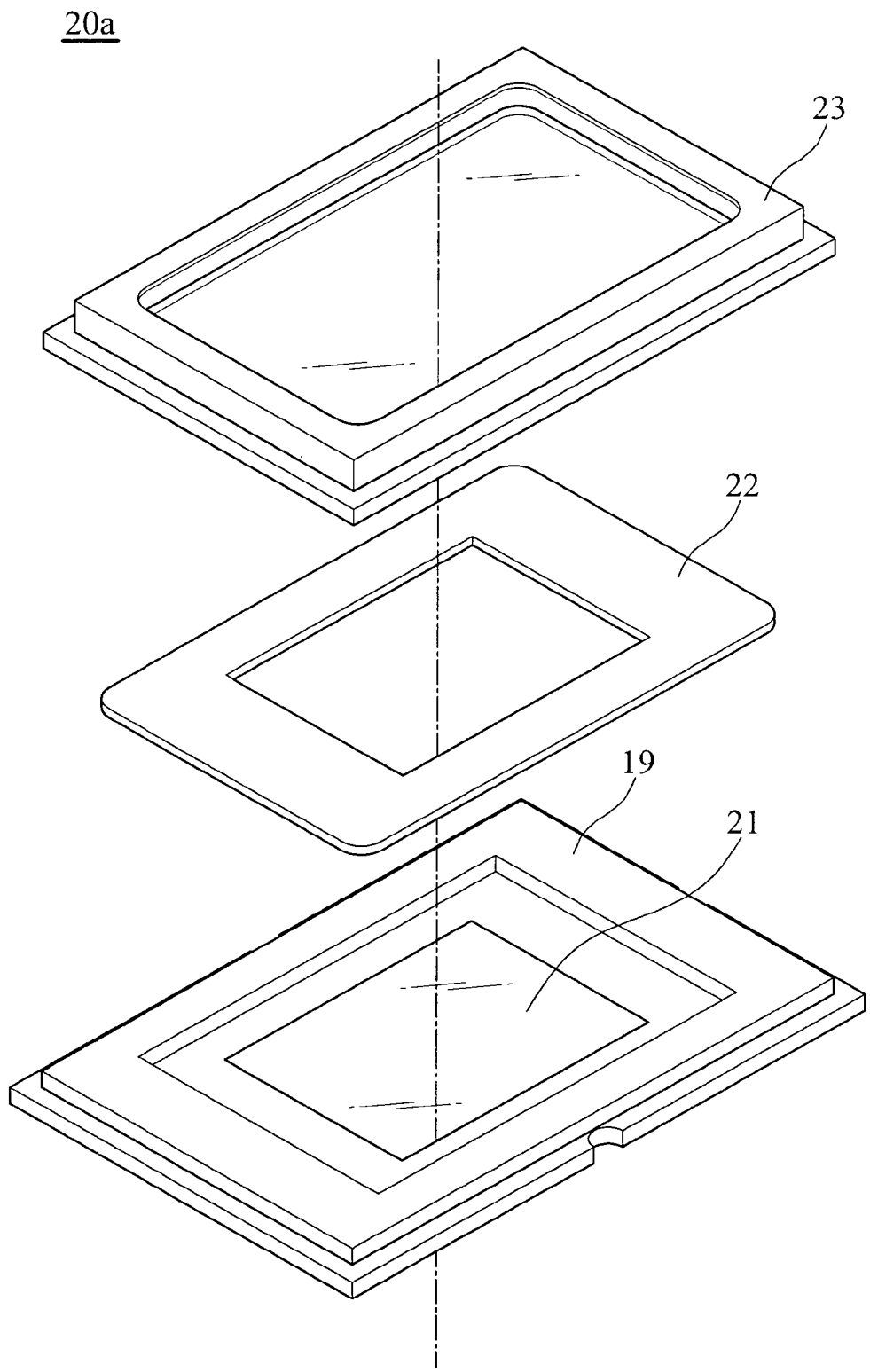
FIG. 2B is an exploded perspective view of the light valve (20a) of FIG. 2A.
Figure 3A:
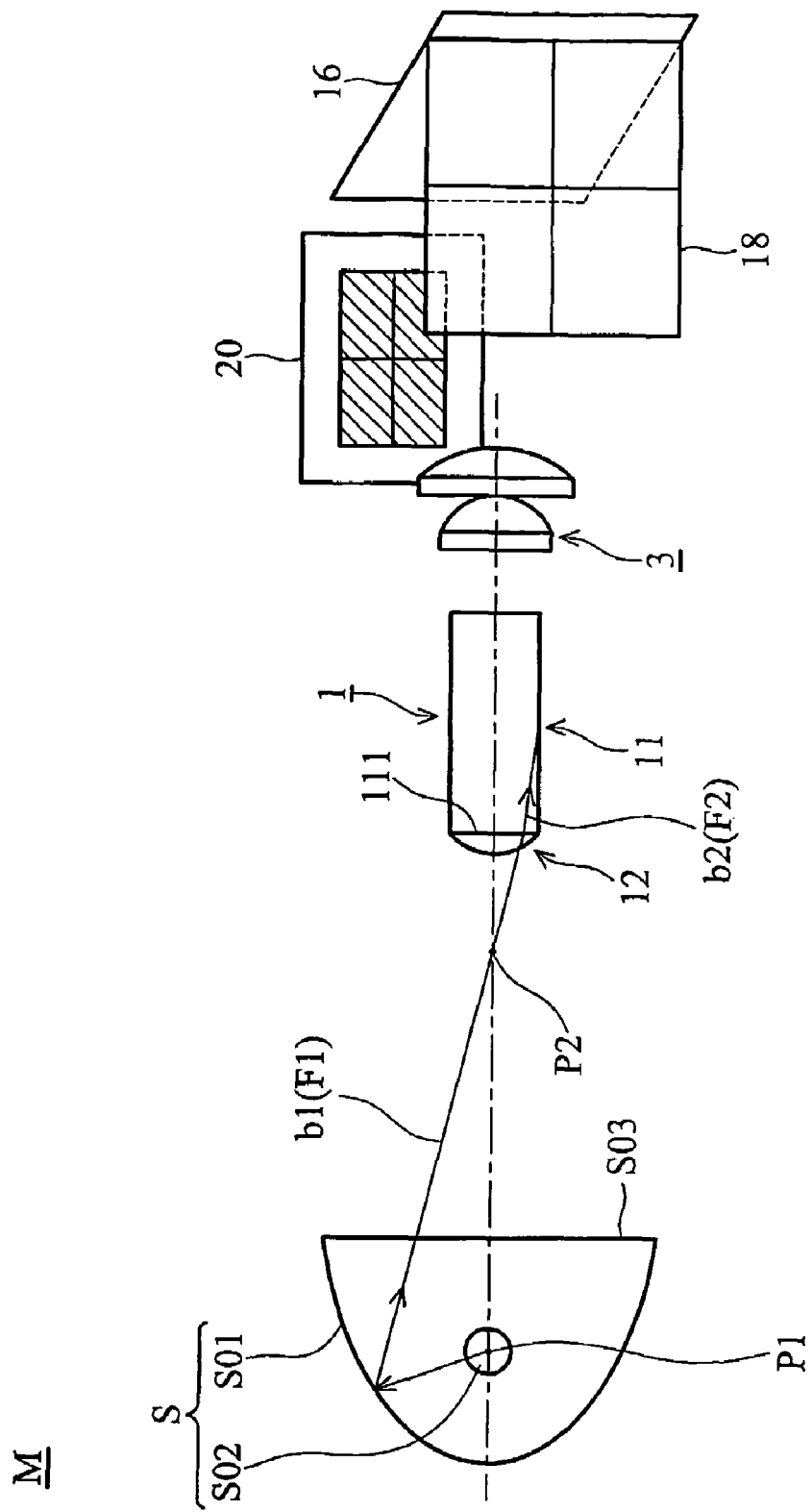
FIG. 3A is a schematic view of a projection system (M) and a light-guiding assembly (1) of a first embodiment of the invention, wherein the light-guiding assembly (1) comprises a body (11) and a main lens (12).

In FIG. 3A, a projection system M of a first embodiment of the invention comprises a light source module S, a light-guiding assembly 1, a projecting lens assembly 3, a first reflecting lens 16, a power mirror 18 and a light valve 20 (e.g. Digital Micro-mirror Device, DMD). A light beam from the light source module S is sequentially reflected by the light-guiding assembly 1, reflected from the projecting lens assembly 3 to the first reflecting lens 16, reflected from the first reflecting lens 16 to the power mirror 18, reflected from the power mirror 18 to the light valve 20.

The light source module S comprises a reflective mask S01 and a light source S02. In this embodiment, the reflective mask S01 is an ellipsoidal reflective mask having a first focus P1 and a second focus P2. The light source S02 is disposed at the first focus P1. The reflective mask S01 comprises an opening S03 and a light source S02 disposed in the reflective mask S01. When the light source S02 is actuated, a first light beam b1 is reflected from the reflective mask S01 and passing through the opening S03.

The light-guiding assembly 1 comprises a body 11 having an incident end 111 and a main lens 12 disposed on the incident end 111. In this embodiment, the main lens 12 is a convex lens disposed after the second focus P2.

In other embodiments, the main lens 12 can be a concave lens, a spheric lens or an aspheric lens (not shown in FIGS.). After a first light beam is converted into a second light beam by the concave lens disposed before the second focus P2, the second light beam has a larger second f-number and a slower light path with respect to the first light beam, thus, increasing contrast of the projected image.

Figure 3B:
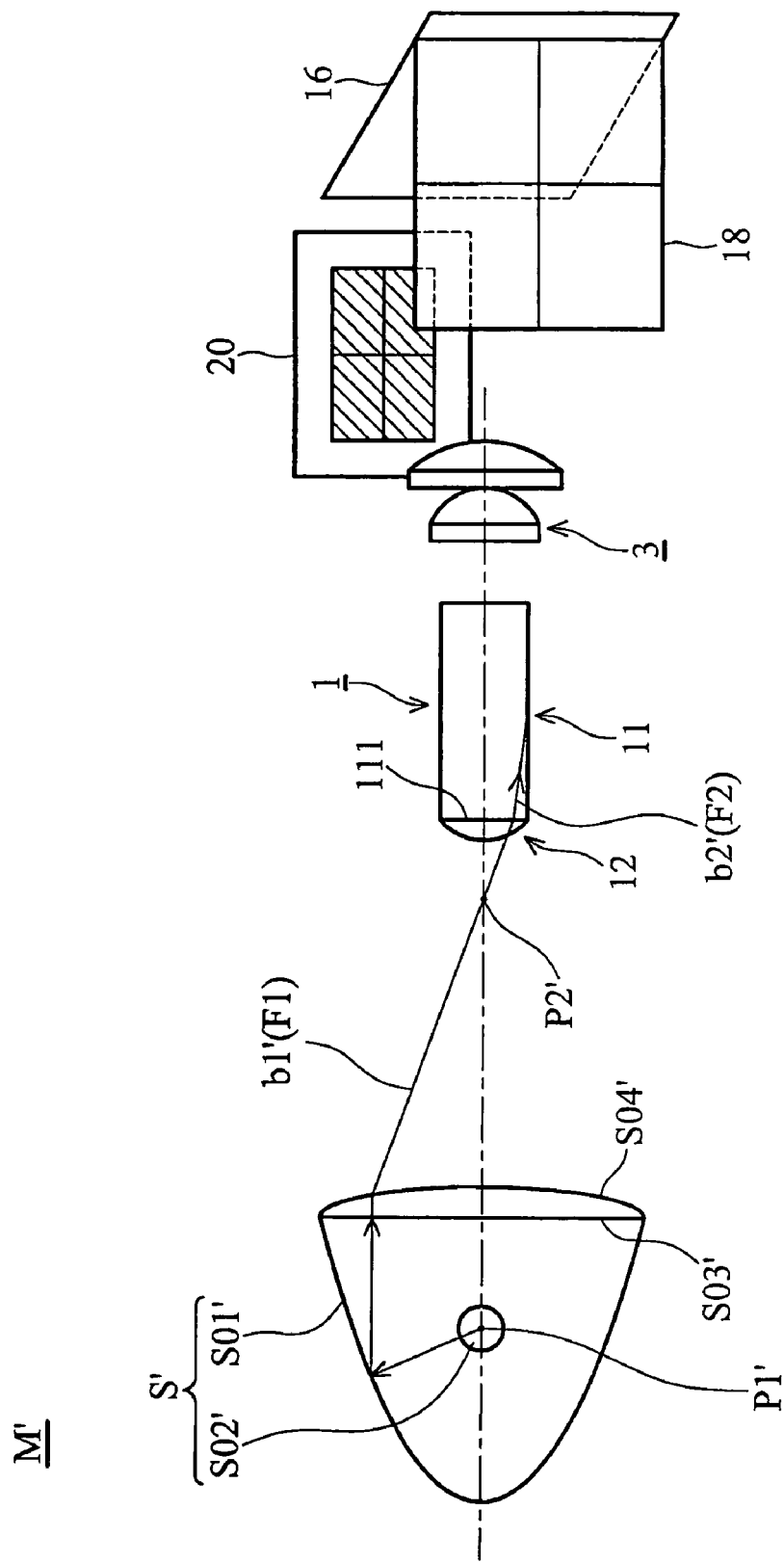
FIG. 3B is a schematic view of a projection system (M') and a light-guiding assembly (1) of a second embodiment of the invention.

In FIG. 3B, the projection system M' of a second embodiment differs from the projection system M of the first embodiment in that the projection system M' further comprises a focus lens S04' disposed on the opening S03' of the parabolic reflective mask S01' and the reflective mask S01' of the light source module S' is a parabolic reflective mask S01' having a third focus P1' and a fourth focus P2'. Note that a first light beam b1' generated from the light source S02' disposed at the third focus P1' is a parallel light beam when, the light source S02' is disposed at the third focus P1'. In this embodiment, the first light beam b1' generated from the light source S02' is focused at the fourth focus P2' by the focus lens S04', and the main lens 12 is a convex lens disposed after the fourth focus P2' (not shown in FIGS.).

Figure 3C:
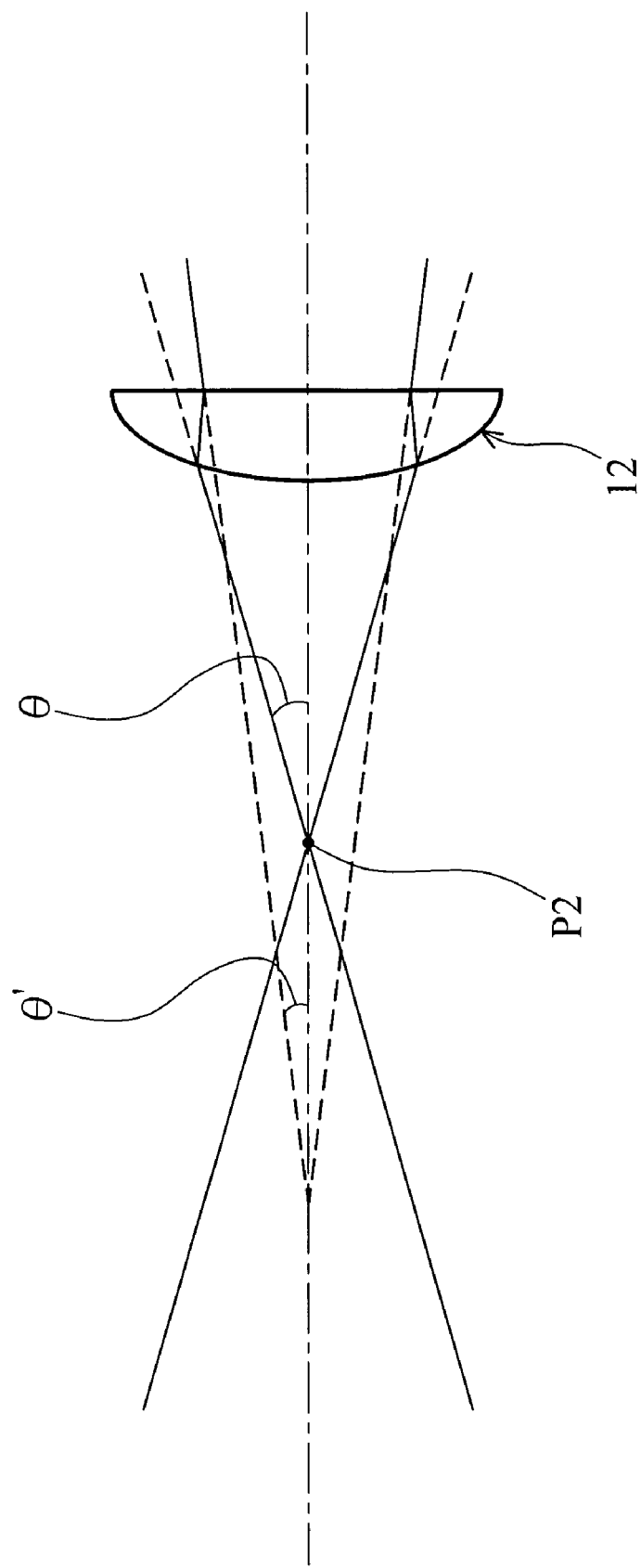
FIG. 3C is a schematic view showing distribution of an incident light beam passing through the main lens (12).

FIG. 3C is a schematic view showing distribution of an incident light beam passing through the main lens 12. With the main lens 12, the first light beam b1 having the first f-number F1 and a converged angle θ can be converted into the second light beam b2 having the second f-number F2 and a converged angle θ'. The converged angle θ' of the second light beam b2 is smaller than the converged angle θ of the first light beam b1.

Figure 4A:
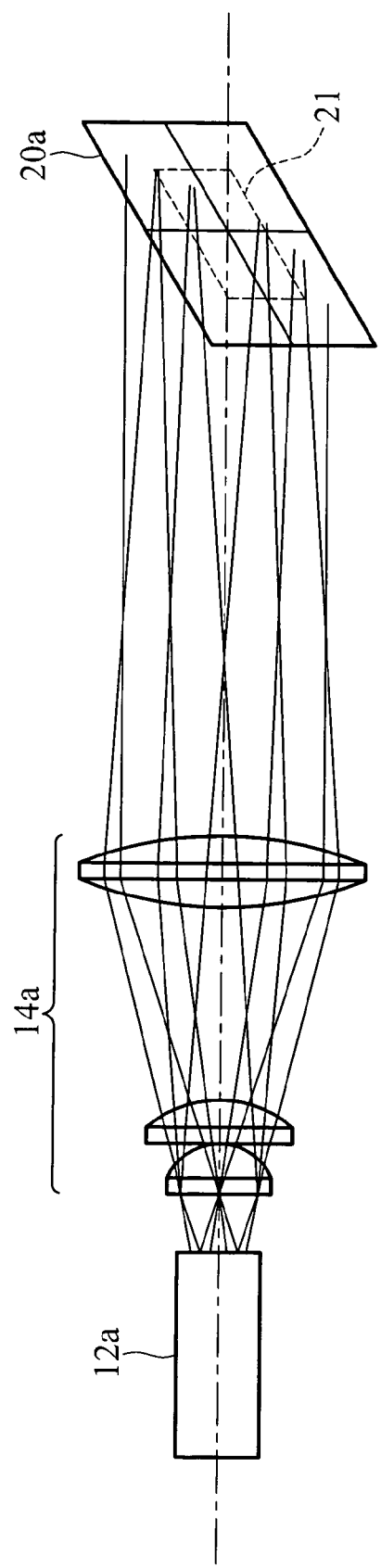
FIG. 4A is a schematic view showing distribution of light path of the conventional projection system of FIG. 1.
Figure 4B:
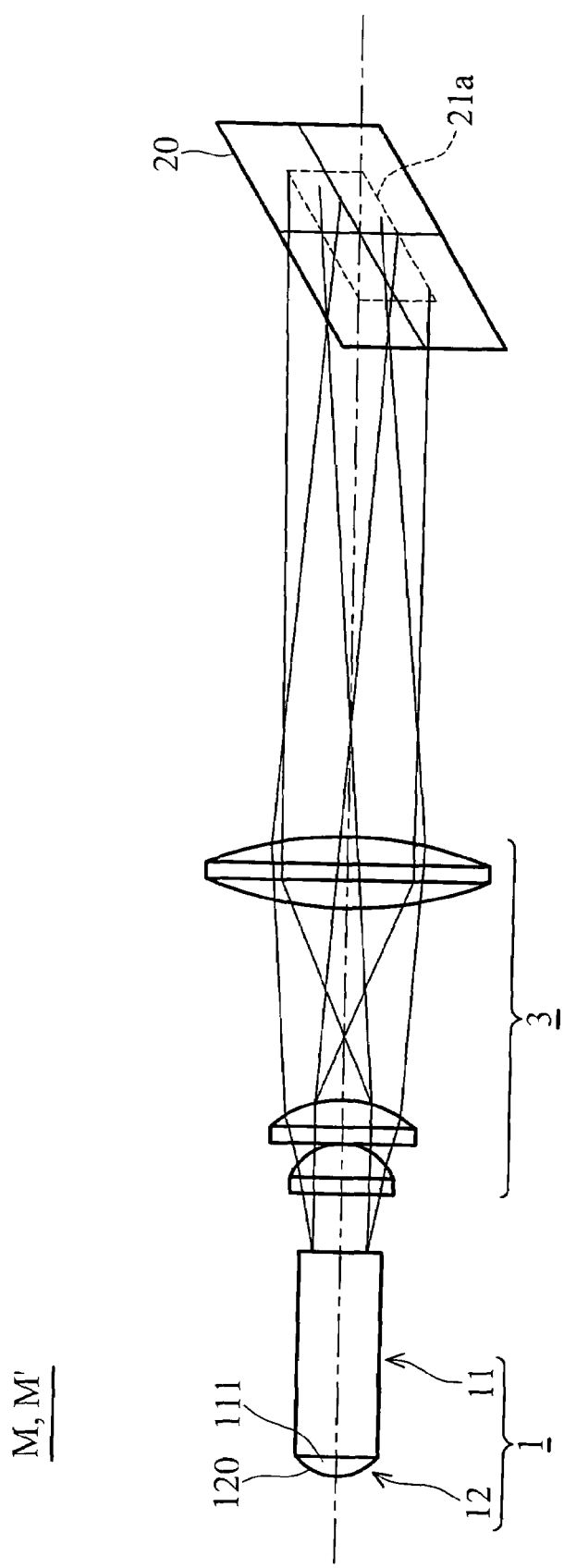
FIG. 4B is a schematic view showing distribution of light path of the projection system (M) of FIG. 3A.

FIG. 4B is a schematic view showing distribution of the light path of the projection system M of FIG. 3A. The light beam projecting on the DMD chip 21*a* of the light valve 20 in FIG. 4B is more convergent than that in FIG. 4A. The light beam is efficiently reflected to the lens by the DMD chip 21*a*, which prevents the scattered light formed by a light reflected by the window assembly, aperture and ceramic substrate from entering the light processing system, avoids light leakage and increases contrast of the projected image.

While the invention has been described with respect to preferred embodiment, it is to be understood that the invention is not limited thereto, but, on the contrary, is intended to accommodate various modifications and equivalent arrangements included within the spirit and scope of the appended claims.

What is claimed is:

1. A projection system, comprising:
a reflective mask having an opening;
a light source disposed in the reflective mask, to form a first light beam reflected from the reflective mask and passing through the opening; and
a light-guiding assembly for receiving the first light beam to form a second light beam, the light-guiding assembly comprising:
a body having an incident end; and
a spherical main lens disposed on the incident end.

2. The projection system as claimed in claim 1, wherein the first light beam comprises a first f-number and passes through the main lens to form the second light beam with a second f-number which is different from the first f-number.

3. The projection system as claimed in claim 2, wherein the second f-number is larger than the first f-number.

4. A projection system comprising:
a reflective mask having an opening;
a light source disposed in the reflective mask, to form a first light beam reflected from the reflective mask and passing through the opening; and
a light-guiding assembly for receiving the first light beam to form a second light beam, the light-guiding assembly comprising:
a body having an incident end; and
a main lens disposed on the incident end,
wherein the first light beam comprises a first f-number and passes through the main lens to form the second light beam with a second f-number which is larger than the first f-number,
wherein the reflective mask further comprises an ellipsoidal reflective mask having a first focus, and the light source is disposed at the first focus.

5. The projection system as claimed in claim 4, wherein the ellipsoidal reflective mask further comprises a second focus, and wherein the main lens comprises a convex lens disposed after the second focus.

6. A projection system comprising:
a reflective mask having an opening;
a light source disposed in the reflective mask, to form a first light beam reflected from the reflective mask and passing through the opening; and
a light-guiding assembly for receiving the first light beam to form a second light beam, the light-guiding assembly comprising:
a body having an incident end; and
a main lens disposed on the incident end,
wherein the first light beam comprises a first f-number and passes through the main lens to form the second light beam with a second f-number which is larger than the first f-number,
wherein the reflective mask further comprises a parabolic reflective mask having a first focus and the light source is disposed at the first focus, and the light source module further comprises a focus lens disposed on the opening of the parabolic reflective mask.

7. The projection system as claimed in claim 6, wherein the focus lens further comprises a second focus, and wherein the main lens comprises a convex lens disposed after the second focus.

8. A light-guiding assembly for a projection system, to receive a first light beam and convert the first light beam into a second light beam, the light-guiding assembly comprising:
a body comprising an incident end; and
a spherical main lens disposed on the incident end.

9. The light-guiding assembly as claimed in claim 8, wherein the first light beam comprises a first f-number and passes through the main lens to form the second light beam, with a second f-number which is different from the first f-number.

10. The light-guiding assembly as claimed in claim 9, wherein the second f-number is larger than the first f-number.

11. The light-guiding assembly as claimed in claim 8, wherein the main lens comprises a convex lens.

* * * * *